UNITED STATES PATENT OFFICE.

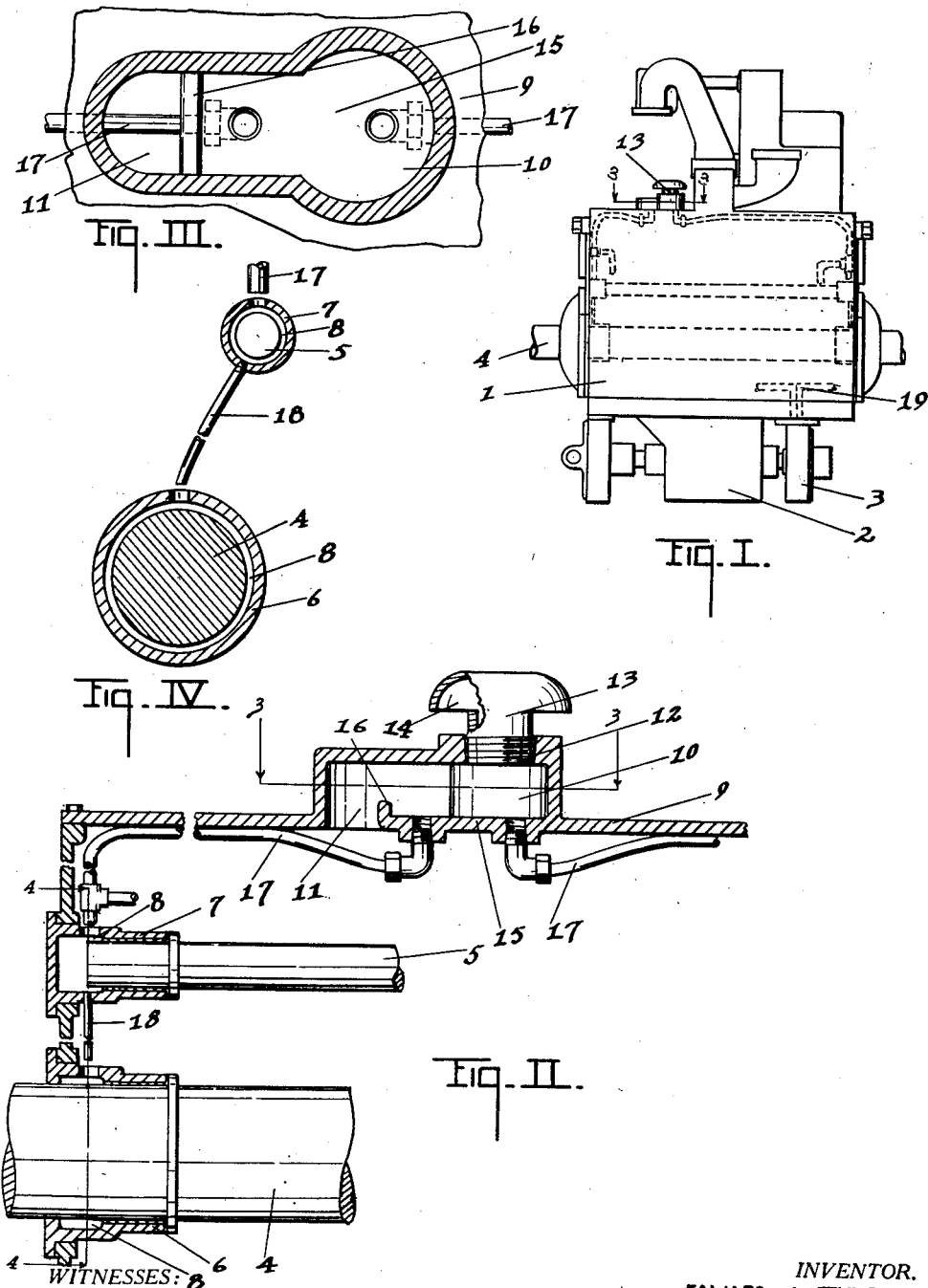

EDWARD A. FIELD, JR., OF GRAND RAPIDS, MICHIGAN, ASSIGNOR OF ONE-FOURTH TO EDWARD A. FIELD, SR., OF CHICAGO, ILLINOIS.

ENGINE-LUBRICATOR.

1,329,388.  Specification of Letters Patent.  Patented Feb. 3, 1920.

Application filed April 17, 1919. Serial No. 290,740.

*To all whom it may concern:*

Be it known that I, EDWARD A. FIELD, Jr., a citizen of the United States, residing at Grand Rapids, Michigan, have invented certain new and useful Improvements in Engine-Lubricators, of which the following is a specification.

This invention relates to improvements in engine lubricators.

The main objects of this invention are:

First, to provide an improved lubricating means for internal combustion engines in which the bearings, such as the cam shaft and crank bearings automatically receive a supply of lubricant whenever lubricant is introduced to the crank-case.

Second, to provide in an engine an improved means whereby the main bearings, such as the cam and crank shaft bearings, may be given a preliminary lubrication prior to the starting of the engine.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail elevation of an engine embodying the features of my invention, various parts being shown in conventional form, the bearings to be lubricated and their shafts and the lubricant conduits being indicated by dotted lines.

Fig. II is an enlarged detail view partially in broken section.

Fig. III is a horizontal section through the breather chamber on a line corresponding to line 3—3 of Figs. I and II.

Fig. IV is a detail vertical section on a line corresponding to line 4—4 of Fig. II.

In the drawings, similar reference characters refer to similar parts throughout the several views, and the sectional views are taken looking in the direction of the little arrows at the ends of the section lines.

Referring to the drawing, 1 represents the crank case of an engine, 2 the oil sump, 3 the oil pump, 4 the crank shaft and 5 the cam shaft of an internal combustion engine. These several parts are shown mainly in conventional form.

The bearings 6 of the crank shaft are disposed in a plane below the bearings 7 of the cam shaft. These bearings have lubricant chambers 8 through which the lubricant is delivered to the bearings.

In the top 9 of the crank case is a breather chamber 10 opening into the crank case at 11. The opening 12 of the breather chamber to the outer air is provided with a baffle cap 13, that is, the outer end of the cap is closed and has inwardly directed openings 14 therein through which the air passes. This cap is adapted to be removed so that the opening 12 may be utilized as a filler opening, or opening for the introduction of lubricant. The bottom 15 of the breather chamber has a lip 16 at its end so that it constitutes a pan or trough from which the lubricant overflows into the crank case.

This pan or trough is connected by the conduit 17 to deliver lubricant to the bearings 7, see Fig. II. The bearings 7 are provided with conduits 18 delivering to the lower bearings 6. The pump conduits 19 are connected to deliver to the conduits 17 above the bearings 7. When lubricant is introduced into the crank case through the opening 12, a portion of it is retained by the trough, and flows through the conduits 17 directly to the bearings.

By this arrangement, a thorough lubrication and drenching of the bearings is insured whenever lubricant is supplied to the engine, the bearings being thus automatically lubricated each time lubricant is supplied. As it is quite common practice to replenish the supply of lubricant in an engine before starting the same, the bearings are automatically lubricated before starting. If it is not desired to replenish the supply of lubricant in the crank case each time before starting the engine, a sufficient quantity of lubricant may be introduced to lubricate the bearings before starting, so that when the engine is started the bearings are properly lubricated. This relieves the bearings of substantial wear, as it is well-known that there is considerable wear on bearings before a lubricating pump driven by the engine becomes effective for delivering lubricant.

I have illustrated and described my improvements in an embodiment which I find very practical. I have not attempted to illustrate or describe certain adaptations or modifications which I contemplate, as I believe the disclosure made will enable those skilled in the art to embody or adapt the same as may be desired.

Having thus described my invention what I claim as new and desire to secure by Letters Patent is:

1. The combination in an engine, provided with cam and crank shaft bearings, the cam shaft bearings being disposed in a plane about the crank shaft bearings, and a lubricating pump, a breather chamber provided with a breather opening adapted also as a lubricant filler opening, the bottom wall of the chamber constituting a trough, conduits leading from said trough to the upper of said bearings, conduits leading from the upper bearings to the lower, and conduits for the pump connected to said conduits leading to the upper bearings.

2. In an engine, the combination of a crank case adapted as a lubricant container, bearings to be lubricated inclosed in said crank case, a lubricant pump, said crank case being provided with a breather opening adapted as a lubricant filler opening, a trough disposed below said opening and from which the lubricant overflows into the crank case, conduits leading from said trough to the bearings, and conduits leading from said pump to the bearings to be lubricated.

3. In an engine, the combination with a crank case and a bearing to be lubricated, said crank case having a breather opening in a plane above said bearing adapted as a lubricant filler opening, of a trough below said opening adapted to receive the lubricant, and a conduit leading from said trough to the bearing whereby when lubricant is introduced into the crank case a portion thereof is delivered to the bearing.

4. In an engine, the combination of a crank case adapted as a lubricant container, a bearing to be lubricated inclosed in said crank case, said crank case having an opening above said bearing for the introduction of lubricant, a conduit delivering to said bearing adapted to receive a part of the lubricant introduced to the crank case through said opening and conduct it to the bearing, and a lubricant pump delivery to said bearing.

In witness whereof I have hereunto set my hand and seal in the presence of two witnesses.

EDWARD A. FIELD, Jr. [L. S.]

Witnesses:
 LUELLA G. GREENFIELD,
 MARGARET L. GLASGOW.